United States Patent [19]
Baldwin et al.

[11] B 3,914,133

[45] Oct. 21, 1975

[54] THERMAL BATTERY

[75] Inventors: Arlen R. Baldwin; Thomas A. Reinhardt, both of Albuquerque, N. Mex.

[73] Assignee: The United States of America as represented by the United States Energy Research & Development Administration, Washington, D.C.

[22] Filed: Apr. 17, 1973

[21] Appl. No.: 351,926

[44] Published under the Trial Voluntary Protest Program on January 28, 1975 as document no. B 351,926.

[52] U.S. Cl. .............................................. 136/83 T
[51] Int. Cl.² ........................................... H01M 4/36
[58] Field of Search .................... 136/83 T, 83, 112

[56] References Cited
UNITED STATES PATENTS

| | | | |
|---|---|---|---|
| 3,533,844 | 10/1970 | Klopp et al. | 136/83 T |
| 3,677,822 | 7/1972 | Bush | 136/83 T |

*Primary Examiner*—Winston A. Douglas
*Assistant Examiner*—C. F. Lefevour
*Attorney, Agent, or Firm*—Dean E. Carlson; Dudley W. King; Richard E. Constant

[57] ABSTRACT

An improved thermal battery which includes a depression at the interface of electrolyte pellet and anode for trapping of molten material therebetween.

8 Claims, 5 Drawing Figures

THERMAL BATTERY

BACKGROUND OF THE INVENTION

A thermal battery generally includes a normally solid fusible electrolyte in each of its electrochemical cells which is heated by some appropiate means to fuse the electrolyte and thus activate the cells and battery. The battery will continue to operate so long as its temperature is maintained above the melting point of the electrolyte, until chemicals are used up in the electrochemical process which produces the electricity, or until some failure mechanism occurs which prevents further battery operation. Most generally, the uncontrollable limiting factor in thermal battery life is in the latter mechanism.

A typical thermal battery may be such as is described in U.S. Pat. No. 3,677,822 to Donald M. Bush and dated July 18, 1972. This battery will generally operate for a time period before the battery output decreases or terminates. It has been found that these batteries may fail due to small quantities or drops of molten conductive material forming about the outer edges of the cell which may accumulate sufficiently to cause a bridging or shorting of cell electrodes. These drops are often a calcium-lithium compound or alloy (such as $CaLi_2$) which is formed at the interface between the anode and the electrolyte pellet of each battery cell. The anode in these batteries is generally formed from calcium while the electrolyte pellet is formed from a three-component mixture of a depolarizer (for example calcium chromate), an electrolyte (for example a fused mixture of potassium chloride and lithium chloride in a eutectic composition) and a binder (for example silicon dioxide). The molton drops of $CaLi_2$ are believed to be the actual active anode of the electrochemical cell system. Since the cells and the cell parts are pressed together and generally maintained under pressure so as to insure good electrical contact between the cell elements during operation, the molten alloy when formed tends to move due to inherent variations in internal cell stack forces or to shock and vibration forces and may eventually reach the edges or periphery of the cells where they thus accumulate. When sufficient material accumulates at the edge of a cell, the cell may be shortened and cause battery failure. This shorting may often occur within 5 to 15 minutes after operation of the thermal battery begins and many times in less than 5 minutes in shock or vibration environments. The movement of this alloy not only may cause shorting of cells but its removal from the active portion of the cell may cause a decrease in cell efficiency and output.

Attempts have been made to overcome these problems by positioning insulators about the edges of the cell stack elements, by providing gaps or spaces about the edges for accumulation of the alloy without bridging electrodes and by chemical modifications to the electrochemical system to suppress formation of the alloy. All of these attempts tend to decrease the efficiency of the electrochemical system or its capability to produce electricity, are only partially successful in preventing this bridging, or substantially add to cost of manufacture.

SUMMARY OF INVENTION

In view of the above, it is an object of this invention to provide a thermal battery which will prevent the formation of molten materials about the edges of the battery cells and at the same time enhance the efficiency of the electrochemical system.

It is a further object of this invention to provide such an improved thermal battery without substantial modification to existing thermal battery arrangements.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention may be made by those skilled in the art.

The invention comprises a thermal battery which utilizes one or more depressions in the surface of the electrolyte pellet and/or anode electrode at their interface for trapping of molten material formed at the surface during battery operation.

DESCRIPTION OF DRAWING

The invention is illustrated in the accompanying drawing wherein.

DETAILED DESCRIPTION

Figure 1:
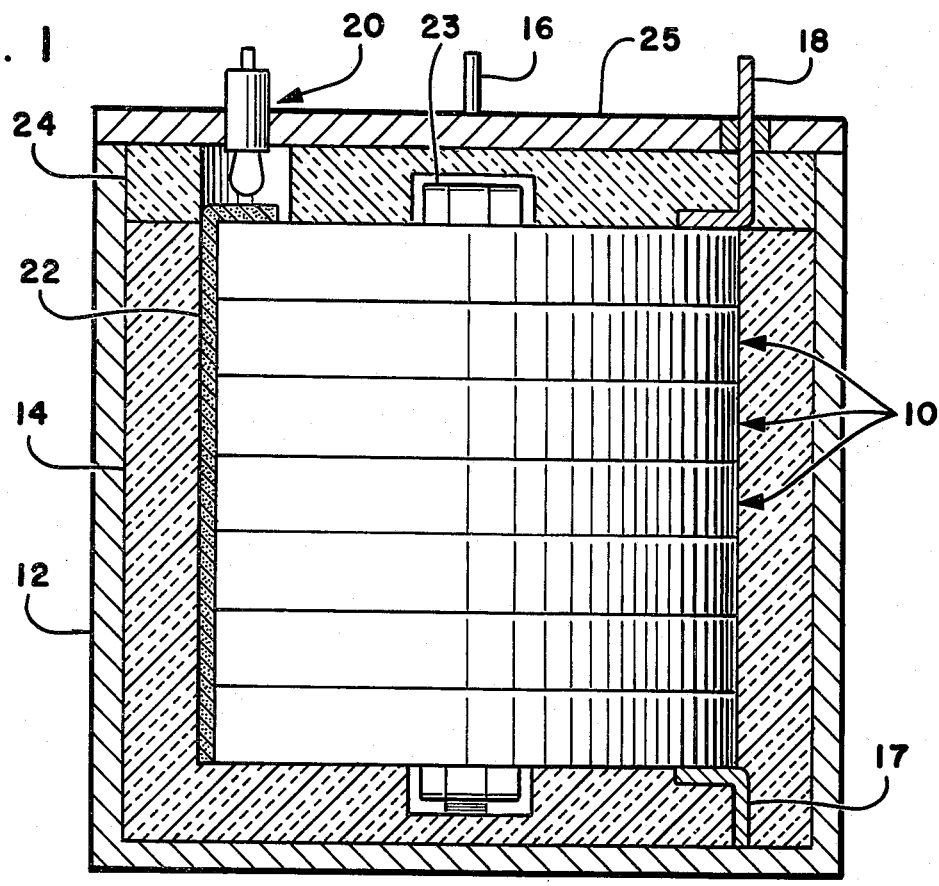
FIG. 1 is a partially cross-sectional view of a thermal battery in which this invention may be utilized.

The thermal battery may include a plurality of electrochemical cells 10 stacked one upon the other in electrical series within a suitable casing 12 and thermal insulating barrier 14. Electrical connections may be made in an appropriate manner by suitable electrical leads and terminals 16, 17 and 18 to the respective positive and negative terminals of the upper and lower battery cells in the stack. The heat or thermal generating elements for the battery, which are generally positioned as a part of each battery cell with or without additional heat generating elements at each end of the battery, may be ignited to activate the battery by a suitable electrical match or detonator 20 and heat powder or fuse 22 which is coupled between the match 20 and the heating generating elements in each cell. The battery is normally formed by first stacking the individual cell elements to form separate cells and then the cells stacked together in the form shown in FIG. 1 and emplaced within the casing 12 and insulator 14 under suitable pressure, such as by a compression force applied by a bolt 23 passing through the center of the cells, or other suitable mechanisms. The so stacked battery cells may then be covered with an end cap insulator 24 and a casing cover 25 in an appropriate manner. The battery is operated by initiating the electrical match 20 and in turn the heat powder 22 and the individual heat generating elements of the cell stack and the electrical current drawn off through appropriate leads 16, 17 and 18.

Figure 2:
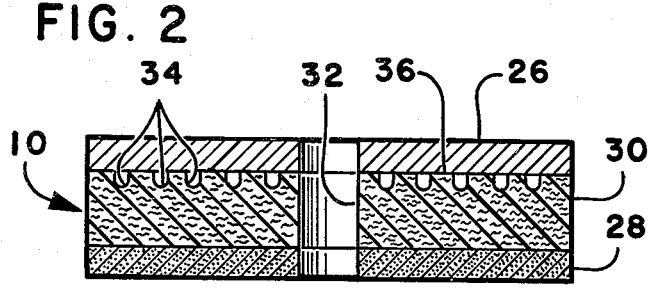
FIG. 2 is a cross-sectional view of a battery cell which may be utilized in the battery of FIG. 1 and which incorporates features of this invention.

The individual cells, in accordance with this invention and as shown in FIG. 2, may include an anode electrode 26 and a heat generating disc 28 separated by an electrolyte pellet 30. Each of the discs or pellets is formed in a generally circular or annular shape of similar or the same diameters and may be provided with a central opening or bore 32 for receipt of the battery cell compression mechanism. The individual cell 10 elements are stacked in the manner shown to provide a sandwich of the anode electrode 26, electrolyte pellet 30 and heat generating disc 28. The anode 26 may be formed of calcium or other like material as a solid disc or as a layer on supporting conductive disc or plate, depending upon the electrochemical reaction utilized by the battery. The electrolyte 30 may be formed from a mixture of a depolarizer and binder with a normally solid fusible electrolyte which becomes conductive upon being heated to above its melting point. For example, the electrolyte may be a eutectic mixture of potassium chloride and lithium chloride. The heat generating disc 28 may be formed from such as iron-potassium perchlorate or the like which, when ignited, is electrically conductive and produces a minimum of gas or other deleterious products.

Figure 3:
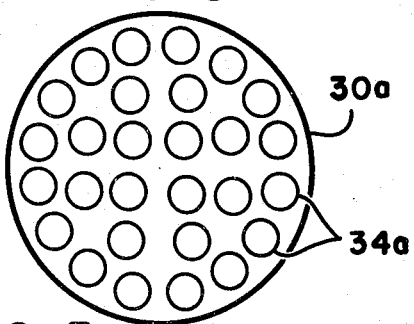
FIG. 3 is a top view of one arrangement of an electrolyte pellet for use in the cell of FIG. 2 and battery of FIG. 1.
Figure 4:
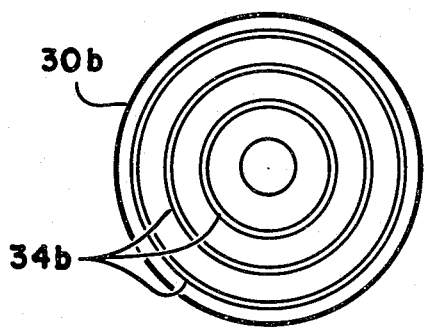
FIGS. 4 and 5 are top views of still other forms of the electrolyte pellet.
Figure 5:
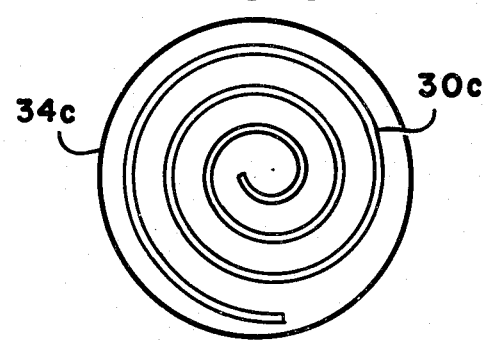

In accordance with this invention, depressed portions or recesses are formed at the interface between the anode electrode 26 and the electrolyte pellet 30 in one or the other or both the electrode 26 and pellet 30. The recesses may be formed as an essentially annular or ring shaped depression, groove or notch in one or many concentric rings or a spiral or as a regular pattern of circular or other shape depressions. It is generally preferred for ease of manufacture and the like that the recesses, such as shown by depressions 34, be formed in the surface 36 of pellet 30 which is adjacent to the anode electrode 26. The depressions 34 may take the form of a plurality of circular depressions 34a in a regular pattern on a surface of the electrolyte pellet 30a as in FIG. 3, one or more concentric rings 34b on a surface of the electrolyte pellet 30b in FIG. 4, or of a spiral 34c on a surface of the electrolyte pellet 34c in FIG. 5. The circular depressions 34a may be positioned, as shown, so as to fall along concentric rings about pellet 30a with the depressions in adjacent rings offset or staggered from those in adjoining rings. The depressions 34a, 34b and 34c are preferably evenly distributed across the surface of the electrolyte pellets 30a, 30b and 30c to insure the most effective distribution of the molten and active anode material over a maximum area of the electrolyte pellet. The depressions are also located so as to intersect all radii of the electrolyte pellet to maximize trapping of molten material wherever it may form at the interface. As molten active anode materials are formed between the interface of anode electrode 26 and the electrolyte pellet 30, the molten materials may move about the surface or interface and reach a portion of the depression 34. The molten material will be effectively trapped in these depressions without degradation of the electrochemical cell reaction and battery outputs. It is understood that the pellets 30a, 30b and 30c in FIGS. 3, 4 and 5 may represent anode electrodes with recesses formed similarly therein to provide the same trapping.

In a typical application, the depressions 34 may be from about 0.004 to 0.015 inch deep and from about 0.25 to 0.030 inch wide and include a depression volume of from about 0.001 to 0.002 cubic inches per square inch of pellet interface surface area of the cell 10. By positioning the depressions, as shown, in an essentially annular shape or regular pattern, the depressions will intersect all potential paths of molten material movement toward the outer edge of the electrolyte pellet 30. This effectively prevents formation of sufficient molten material at outer edges of the cell which may cause bridging of cell electrodes from molten materials formed at peripheral portions of the electrolyte pellet which are not traversed by a trapping depression.

The depressions 34 may be placed in a face of the electrolyte pellet 30 by any appropriate molding, cutting or other forming operation and may, in fact, be molded into the electrolyte pellet during its formation, as the pellet is commonly formed by compacting a mixture of powders in a mold. Thus, the electrolyte pellet may be formed in the desired shape in a common manner without any modification of prior formation processes, other than provision of appropriate mold shapes to provide the depressions.

Thermal batteries formed in accordance with this invention can be operated at low current drains and produce electrical outputs for time periods of as long as 60 minutes or longer and generally for no less than 30 minutes using the arrangement shown in the drawing and in the patent referred to above without shorting between cell electrodes from molten materials formed during the active discharge period. In addition, operating thermal batteries formed have greatly increased resistance to shorting due to movement of molten material resulting from mechanical environments of shock and vibration.

What is claimed is:

1. A thermal battery comprising a casing; a plurality of electrochemical cells stacked in said casing, each cell including an anode disc, an electrically conductive heat generating disc, and a normally solid fusible electrolyte disc sandwiched between said anode and heat generating discs in direct contact with said anode over a substantial portion of their adjacent surfaces, at least one of said anode and electrolyte discs being provided with depressed portions at interface between said anode and electrolyte discs and spaced radially inward from peripheral portions of said discs, the depressed portions being disposed circumferentially about the interface for trapping and inhibiting movement of molten materials, formed at said interface during said battery operation, to peripheral edges of said cells; and means for igniting said heat generating discs.

2. The battery of claim 1 wherein said depressed portions are of generally annular form.

3. The battery of claim 2 where said depressed portions are in the form of one or more concentric rings.

4. The battery of claim 2 wherein said depressed portions are in the form of a spiral expanding from near the center of said discs.

5. The battery of claim 1 including a plurality of depressed portions in said discs.

6. The battery of claim 5 wherein each of said depressed portions are circular in shape in a regular pattern about said discs, with at least one circular depression intersecting every radius of said discs.

7. The battery of claim 1 wherein said depressions occupy a volume of from about 0.001 to about 0.002 cubic inches per square inch of a disc surface area.

8. The battery of claim 1 wherein said anode is calcium, said electrolyte disc is a three component mixture of depolarizer, electrolyte and binder and said depolarizer is clacium chromate, said electrolyte is a eutectic composition of potassium chloride and lithium chloride, said binder is silicon dioxide, and said heat generating disc is iron and potassium perchlorate.

* * * * *